(12) United States Patent
Lee

(10) Patent No.: US 8,656,156 B2
(45) Date of Patent: *Feb. 18, 2014

(54) METHOD AND TERMINAL FOR AUTHENTICATING BETWEEN DRM AGENTS FOR MOVING RO

(71) Applicant: LG Electronics Inc., Seoul (KR)

(72) Inventor: Seung-Jae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/665,282

(22) Filed: Oct. 31, 2012

(65) Prior Publication Data

US 2013/0054963 A1    Feb. 28, 2013

Related U.S. Application Data

(63) Continuation of application No. 12/375,500, filed as application No. PCT/KR2007/003800 on Aug. 7, 2007, now Pat. No. 8,321,673.

(60) Provisional application No. 60/836,137, filed on Aug. 8, 2006.

(30) Foreign Application Priority Data

Jul. 23, 2007    (KR) .................. 10-2007-0073703

(51) Int. Cl.
*H04L 9/32*         (2006.01)

(52) U.S. Cl.
USPC ............... 713/158; 713/168; 713/167; 726/4; 455/411

(58) Field of Classification Search
USPC ................ 713/158, 167, 168; 726/4; 455/411
See application file for complete search history.

(56) References Cited

U.S. PATENT DOCUMENTS

| | | | |
|---|---|---|---|
| 7,734,917 B2 | 6/2010 | Chang et al. | |
| 2001/0051925 A1 | 12/2001 | Kang | |
| 2005/0044361 A1* | 2/2005 | Chang et al. | 713/167 |
| 2005/0210241 A1* | 9/2005 | Lee et al. | 713/158 |
| 2005/0216739 A1* | 9/2005 | Lee et al. | 713/168 |
| 2006/0154648 A1* | 7/2006 | Oh et al. | 455/411 |
| 2006/0155650 A1 | 7/2006 | Oh et al. | |
| 2009/0217036 A1* | 8/2009 | Irwin et al. | 713/168 |

* cited by examiner

*Primary Examiner* — Brandon Hoffman
*Assistant Examiner* — Samuel Ambaye
(74) *Attorney, Agent, or Firm* — Birch, Stewart, Kolasch & Birch, LLP

(57) ABSTRACT

A digital Rights Management (DRM), and particularly an apparatus and method of authentication between DRM agents for moving Rights Object (RO) is provided, whereby RO and contents can be moved between DRM agents after a simple authentication therebetween using specific authentication information received from a Rights Issuer (RI), in case where the RO is moved in a user domain or among a plurality of DRM agents.

13 Claims, 11 Drawing Sheets

FIG. 4

| Parameter | ROAP-RegistrationRequest |
|---|---|
| Session ID | M |
| Device Nonce | M |
| Request Time | M |
| Certificate Chain | O |
| Trusted RI Authorities | O |
| Server Info | O |
| Extensions | O |
| Signature | M |

FIG. 5

| Parameter | ROAP-RegistrationResponse | |
|---|---|---|
| | Status = "Success" | Status ≠ "Success" |
| Status | M | M |
| Session ID | M | O |
| RI URL | M | - |
| Certificate Chain | O | - |
| RI OCSP Response | O | - |
| Device OCSP Response | O | - |
| Extensions | O | - |
| Signature | M | - |

FIG. 6

| A2AP-authRequest ||
|---|---|
| Parameter | Mandatory/Optional |
| Sender Device ID | M |
| Sender Nonce | M |
| Timestamp | M |
| Certificate Chain | M |
| OCSP Response | M |
| Extensions | O |
| Message Signature | M |

FIG. 7

| Parameter | A2AP-authResponse ||
| --- | --- | --- |
| | Status = Success | Status ≠ Success |
| Status | M | M |
| Sender Device ID | M | - |
| Reciever Device ID | M | - |
| Request Nonce | M | - |
| Response Nonce | M | - |
| Session ID | M | |
| Certificate Chain | M | - |
| OCSP Response | M | - |
| Extensions | O | - |
| Signature | M | - |

FIG. 8

| Parameter | A2AP-moveRequest |
|---|---|
| Sender Device ID | M |
| Recievers Device ID | M |
| Session ID | M |
| Nonce | M |
| ProtectedRO | M |
| State Information Object | O |
| Message Signature | M |

FIG. 9

| Parameter | A2AP-moveResponse ||
| --- | --- | --- |
| | Status = Success | Status ≠ Success |
| Status | M | M |
| Sender's Device ID | M | - |
| Recievers Device ID | M | - |
| Session ID | M | - |
| Nonce | M | - |
| Message Signature | M | - |

METHOD AND TERMINAL FOR AUTHENTICATING BETWEEN DRM AGENTS FOR MOVING RO

CROSS REFERENCE TO RELATED APPLICATIONS

This application is a Continuation of co-pending application Ser. No. 12/375,500 filed on Jan. 28, 2009, which is the national phase of PCT International Application No. PCT/KR2007/003800 filed on Aug. 7, 2007, and which claims priority to Application No. 10-2007-0073703filed in the Republic of Korea on Jul. 23, 2007, and U.S. Provisional Application No. 60/836,137 filed Aug. 8, 2006. The entire contents of all of the above applications are hereby incorporated by reference.

TECHNICAL FIELD

The present invention relates to a Digital Rights Management (DRM), and more particularly, to an authentication method and apparatus between DRM agents for moving Rights Object (RO), in which RO and contents can be moved between DRM agents after a simple authentication therebetween using specific authentication information received from a Rights Issuer (RI), in case where the RO is moved in a user domain or among a plurality of DRM agents.

BACKGROUND ART

A Digital Rights Management (DRM) refers to a system technology for safely protecting rights for digital contents and systematically managing them. The DRM provides a protecting and managing scheme for preventing the illegal copy of a content, acquiring DRM contents RO, and generating and transferring the content.

FIG. 1 illustrates a construction of a typical DRM system. The DRM system controls content issued to a user by a content provider to be used only in a right-limit of RO. Here, the content provider refers to an entity corresponding to a Content Issuer (CI) and/or a Rights Issuer (RI).

The CI issues a protected content (hereinafter, referred to as DRM content) using a particular encryption key so as to protect the content from users having no access right therefor, while the RI issues RO required to use the protected content.

A DRM agent is mounted in a device thus to receive contents and their ROs from the CI and the RI, respectively. The DRM agent then analyzes (interprets) permission and/or constraint included in the ROs, thereby controlling the use of contents in the device.

Regarding a procedure of moving a domain RO between devices subscribed in a user domain In the related art, a device 1 performs a process of transferring an RO received from the RI to a device 2 through a Move Domain RO Request procedure and a Move Domain RO Response procedure, and sending the contents (DRM content format (DCF)) received from the CI to the device 2. However, in this process, the domain RO movement is allowed to be performed without any confirmation as to whether a receiver device is a properly subscribed member of the user domain, resulting in an occurrence of a security relevant problem.

Therefore, a method for ascertaining whether a receiver device of the RO has available authentication information is required.

DISCLOSURE OF THE INVENTION

One aspect of the present invention involves the recognition by the present inventors of the drawbacks in the related art, as explained above.

Certain features that may be part of the DRM system and device using digital rights with verifying process described above will not be described in much detail, merely to prevent the characteristics of the present invention from being obscured. However, such additional features may also be part of the DRM system and device using digital rights with such verifying process, as would be understood by those skilled in the art.

Therefore, it is an object of the present invention to provide an apparatus and method of authentication between DRM agents for moving RO (Rights Object) in which when an RO is moved in a user domain or among a plurality of general DRM agents, a mutual authentication is simply executed among the DRM agents using specific authentication information transferred from a Rights Issuer (RI) to thereafter allow the RO and related contents to be moved.

To achieve this object, there is provided a method of authentication between DRM agents for moving RO comprising: transferring an authentication request message including first authentication information from a first device to a second device; receiving, by the first device, an authentication response message including second authentication information from second device after verifying whether the first authentication information is valid by the second device; and verifying by the first device whether the second authentication information is valid.

In another aspect of the present invention, a method of authentication between DRM agents for moving RO may comprise: receiving, from a first entity, requested first authentication information by a first DRM agent; performing a mutual authentication by sending the first authentication information from the first DRM agent to a second DRM agent and by receiving second authentication information from the second DRM agent; and transferring, from the first DRM agent to the second DRM agent, a Rights Object (RO) issued by the first entity.

Preferably, the step of transferring the RO may comprise: sending a move request message including first information from the first DRM agent to the second DRM agent; and receiving by the first DRM agent a move response message including second information from the second DRM agent.

In another aspect of the present invention, a method of authentication between DRM agents for moving RO may comprise: sending an authentication request message including first authentication information from a first DRM agent to a second DRM agent; verifying the first authentication information by the second DRM agent to authenticate the first DRM agent; receiving by the first DRM agent an authentication response message including second authentication information from the second DRM agent; verifying, by the first DRM agent, the second authentication information to authenticate the second DRM agent.

In another aspect of the present invention, a method of authentication between DRM agents for moving RO, in a DRM agent authentication method for moving RO issued by a Rights Issuer (RI) among a plurality of DRM agents, may comprise: receiving by a first DRM agent an authentication request message from a second DRM agent in order to check whether first authentication information is contained in the message; checking RI address information included in the authentication request message by the first DRM agent when the first authentication information is not included; and accessing, by the first DRM agent, the RI using the RI address information to receive the first authentication information therefrom.

Preferably, the method may further comprise: verifying by the second DRM agent whether the first authentication information is valid to authenticate the first DRM agent; receiving by the first DRM agent an authentication response message including second authentication information from the second DRM agent; verifying by the first DRM agent whether the second authentication information is valid to authenticate the second DRM agent.

In an aspect of the present invention, there is provided an apparatus of authentication between DRM agents for moving RO comprising: a first entity adapted to transfer authentication information including certificate revocation information related to a device to a DRM agent of the device; a first DRM agent adapted to receive first authentication information thereof and an RO from the first entity, and send the first authentication information to a second DRM agent together with an authentication request message; and a second DRM agent adapted to check the authentication request message and the first authentication information received from the first DRM agent so as to authenticate the first DRM agent, and send to the first DRM agent second authentication information thereof together with an authentication response message so as to allow the first DRM agent to authenticate the second DRM agent for a mutual authentication.

BRIEF DESCRIPTION OF THE DRAWINGS

FIG. 4 is a table showing a message description of a registration request message according to the present invention.

FIG. 5 is a table showing a message description of a registration response message according to the present invention.

FIG. 6 is a table showing a message description of an authentication request message according to the present invention.

FIG. 7 is a table showing a message description of an authentication response message according to the present invention.

FIG. 8 is a table showing a message description of a moveRequest message according to the present invention.

FIG. 9 is a table showing a message description of a moveResponse message according to the present invention.

MODES FOR CARRYING OUT THE PREFERRED EMBODIMENTS

The present invention is applied to a DRM(Digital Rights Management) system and device using digital rights. However, the present invention may be applied to other wired/wireless communications.

The present invention conceptually relates to an authentication method which allows a simply mutual authentication between DRM agents using Online Certificate Status Protocol (OCSP) response parameters obtained when each DRM agent registers in a Rights Issuer (RI) before moving a Rights Object (RO) or a domain RO in a user domain or among plural DRM agents each mounted in a device. This can be applied to every technology associated with Ad Hoc Share as well as Move within typical domains including the user domain.

Technical terms used in the present invention are briefly described as follows.

A device according to the present invention may be commonly referred to as a terminal, which includes every terminal capable of using digital contents. That is, the device according to the present invention, namely, the terminal may include mobile communication terminals capable of using VCC services (e.g., user equipment (UE), mobile phones, cellular phones, DMB phones, DVB-H phones, PDA phones, PTT phones, etc.), digital TVs, GPS navigation, portable game players, MP3, other home electronics and the like. Therefore, the device may be used as the same as the terminal in the present invention. Also, the device according to the present invention may internally include a communication module, a Web/WAP browser, a DRM agent, a media player and library and a memory.

Hereinafter, one embodiment of a method of authentication between Digital Rights Management (DRM) agents for moving RO in a DRM service according to the present invention will be described with reference to the accompanying drawings.

Figure 1:
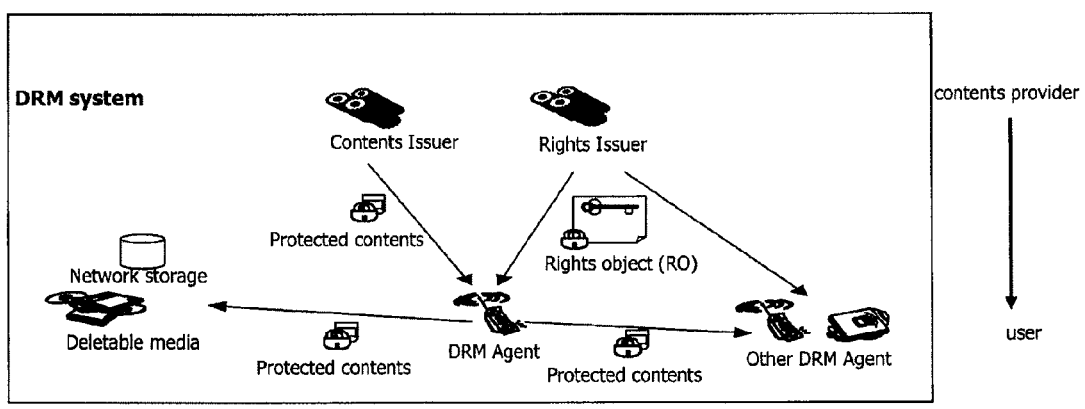
FIG. 1 is an exemplary construction of a typical DRM system.
Figure 2:
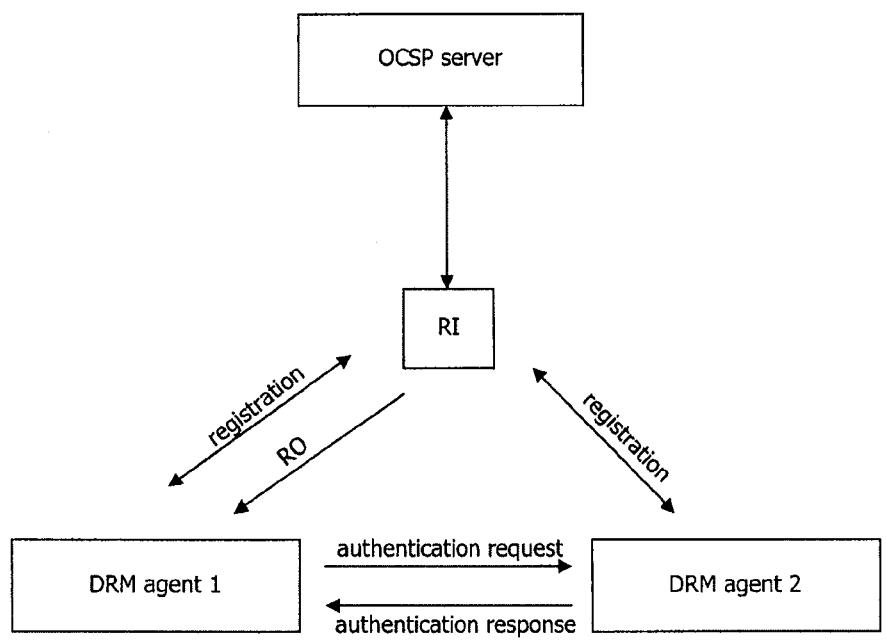
FIG. 2 is a view illustrating a construction of a system for implementing a first embodiment of the present invention.

FIG. 2 illustrates a construction of a system for implementing a method of authentication between DRM agents for moving RO in accordance with a first embodiment of the present invention.

The system may comprise an OCSP server adapted to provide a device OCSP response as a parameter including a DRM agent certificate and revocation information thereof, a Rights Issuer (RI) adapted to receive the device OCSP response from the OCSP server and send the device OCSP response together with a registration response message to a plurality of DRM agents when the corresponding DRM agents request the registration, a DRM agent 1 adapted to receive its device OCSP response and RO from the RI and send the device OCSP response together with an authentication request message to a DRM agent 2, and the DRM agent 2 adapted to check the authentication request message and the device OCSP response received from the DRM agent 1 so as to authenticate the DRM agent 1, and send its device OCSP response together with an authentication response message to the DRM agent 1 so as to allow the DRM agent 1 to check them for a mutual authentication. The device OCSP response, which is a clock-based response, may include a nextUpdate field. In addition, a device in the present invention is assumed to have a DRM time to compare the value of the nextUpdate field of the clock-based OCSP response with a current time.

Figure 3:
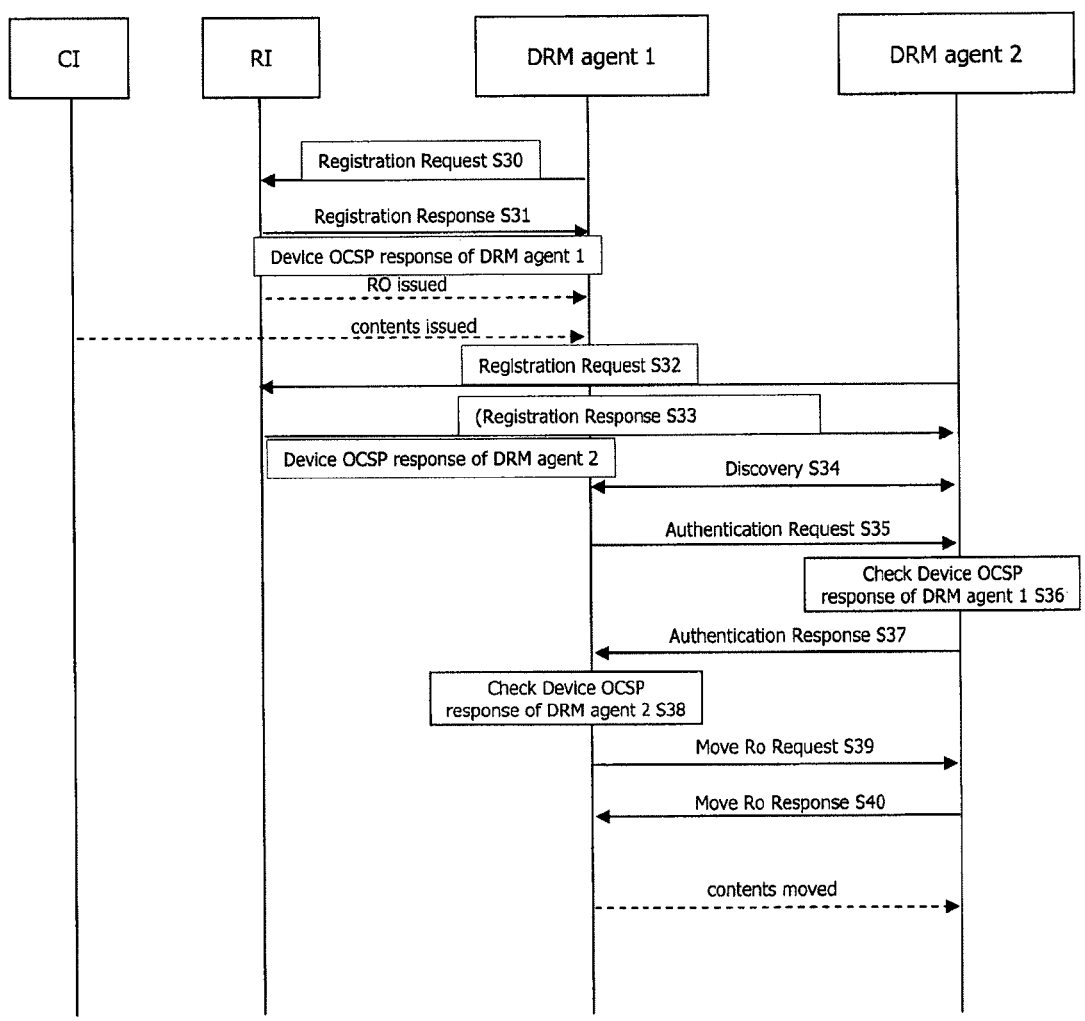
FIG. 3 is a signal flowchart illustrating a method of authentication between DRM agents for moving a domain RO in accordance with the first embodiment of the present invention.
Figure 10:
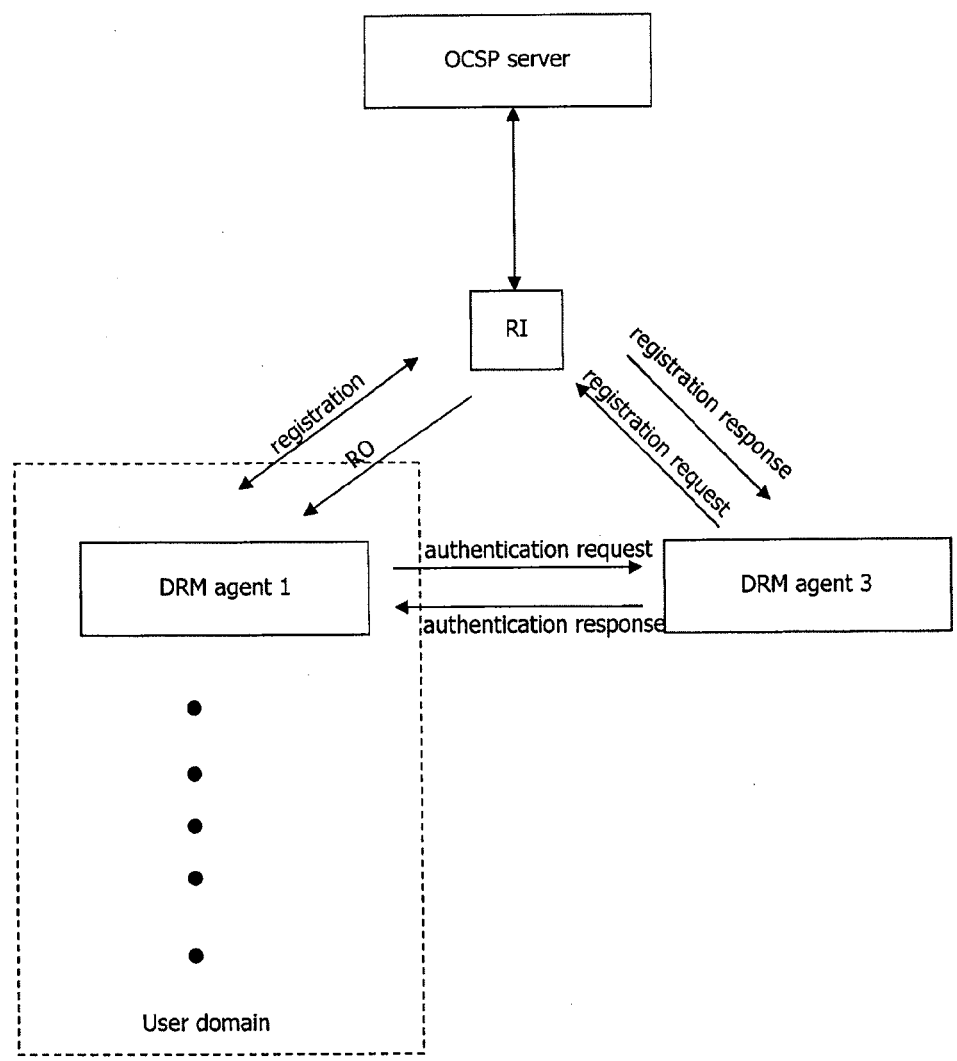
FIG. 10 is a view illustrating a construction of a system for implementing a second embodiment of the present invention.
Figure 11:
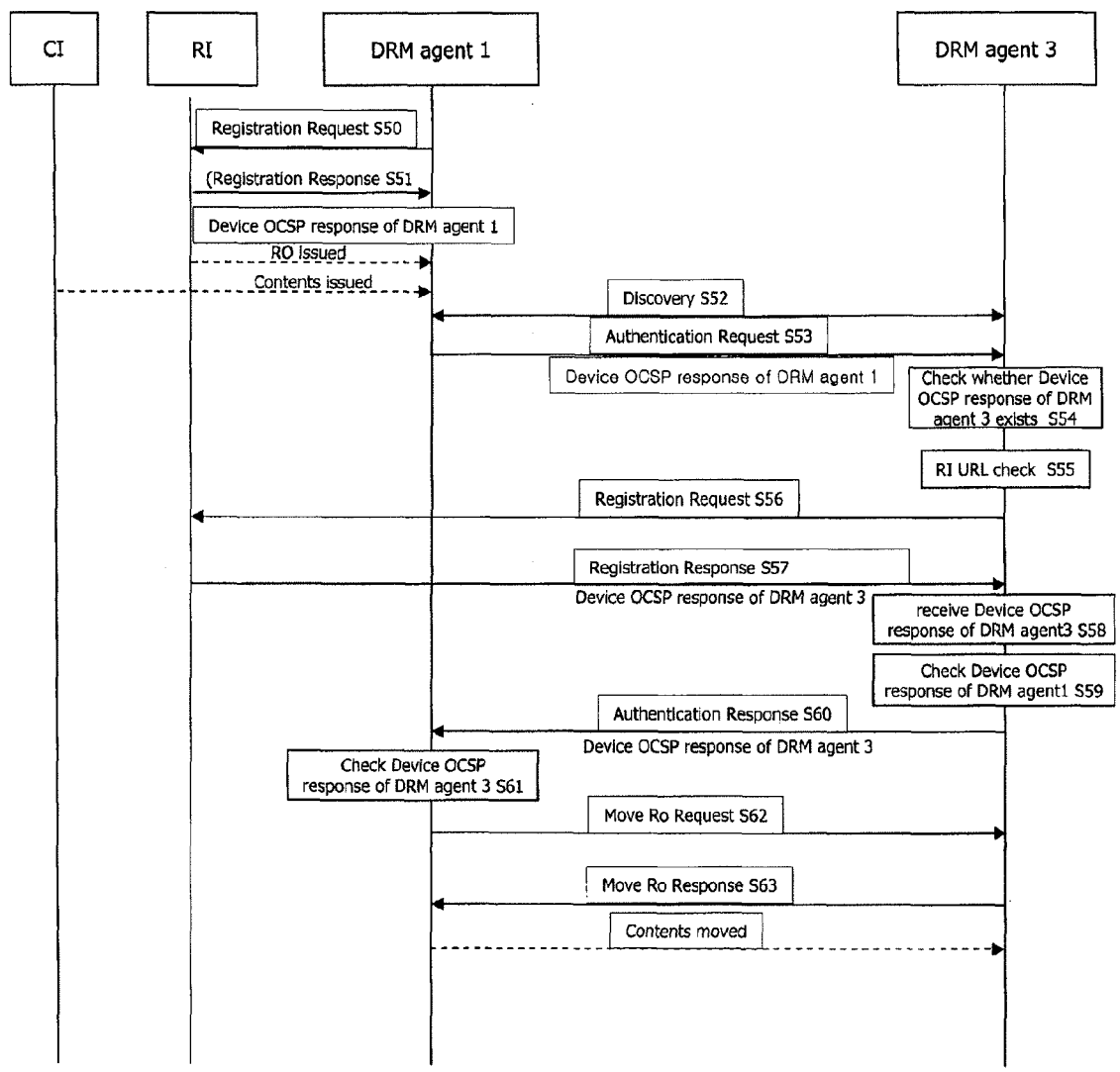
FIG. 11 is a signal flowchart illustrating a method of authentication between DRM agents for moving an RO in accordance with the second embodiment of the present invention.

FIG. 3 is a signal flowchart illustrating an authentication procedure for moving RO between DRM agents in a user domain in accordance with the first embodiment of the present invention.

First, the DRM agent 1 may register in a first entity (i.e., Rights Issuer, RI) in order to acquire a domain RO and contents.

The registration procedure must be re-performed when duration is expired (e.g., when a current time value is greater than the nextUpdate value of the device OCSP response). A device subscribed in the user domain is allocated with a domain key from the RI.

The registration procedure may be performed by a 4-pass registration protocol, the procedure comprising sending a 'Device Hello' message from the DRM agent 1 to the RI, sending an 'RI Hello' message from the RI to the DRM agent 1, send a registration request message from the DRM agent 1 to the RI, and sending a registration response message from the RI to the DRM agent 1.

Here, the 'Device Hello' message may be based on a DRM specification disclosed in the related art, and include an ID of the DRM agent 1, a protocol version and a support algorithm. The 'RI Hello' message may also be based on the DRM specification disclosed in the related art, and include an ID of the RI, a negotiated protocol version and a negotiated algorithm.

The registration procedure will now be described in more detail.

The registration procedure between the DRM agent and the RI is performed by a Right Object Acquisition Protocol (ROAP) message. First, the DRM agent 1 sends a registration request message to the RI (S30). The registration request message, as shown in the message description of FIG. 4, may include a session ID, a device nonce, a request time and a signature as mandatory parameters, and may include a certificate chain, a trusted RI authorities, a server info and an extensions as optional parameters.

The trusted RI authorities parameter denotes an entity (e.g., a trust anchor) trusted by the DRM agent 1. If it is omitted, the RI can select a certificate to send to the DRM agent 1 without constraint.

As illustrated in FIG. 3, when sending the registration request message to the RI, the DRM agent 1 may send the message together with <DeviceOCSPResponse>, which is an extension parameter for requesting a device OCSP response for its authentication.

Upon receiving the registration request message, the RI includes, in a registration response message, a device OCSP response having device certificate revocation information transferred from an OCSP server and then sends the registration response message to the DRM agent 1 (S31).

Upon the successful registration, as shown in the message description of FIG. 5, the registration response message may include a status, a session ID, an RI URL and a signature as mandatory parameters, and may include a certificate chain, an RI OCSP response, a device OCSP response, an extensions and a signature as optional parameters.

Here, the RI OCSP response may include revocation information which indicates whether an RI certificate has been revoked.

The device OCSP response may include revocation information which indicates whether a device certificate has been revoked. The device OCSP response may be used as authentication information when the DRM agent 1 having received the device OCSP response sends rights to another device using an A2AP protocol.

For reference, the RI OCSP response denotes a parameter having RI certificate revocation information which indicates whether an RI certificate has been revoked.

The device OCSP response may also include 'This update information' which indicates time information at which the device OCSP response message is issued, and 'Next update information' which indicates expiration time information of the device OCSP response message. These information (i.e., This update information and Next update information) may be used for verifying validity of the device OCSP response, i.e., validity of certificate and revocation information related to a DRM agent.

After completing the registration procedure, the DRM agent 1 accesses the RI to join a domain using a ROAP-JoinDomain protocol and the like, and then receives an issued domain RO by using a ROAP-ROAcquisition protocol and the like.

The DRM agent 1 may also receive protected contents issued by a Contents Issuer (CI), separate from messages exchanged with the RI.

Here, the CI and the RI may be configured to be one server.

On the other hand, the DRM agent 2 also performs the registration procedure by sending the registration request message to the RI, the first entity, as mentioned above (S32), and receiving the registration response message from the RI (S33).

In the state that the registration procedure of each of the DRM agents 1 and 2 is completed, the DRM agent 1 discovers the DRM agent 2 (S34), and then sends an authentication request message (e.g., Auth Request) to the DRM agent 2 (S35).

The authentication request message, as shown in the message description of FIG. 6, may include a sender device ID, a sender nonce, a timestamp, a certificate chain, a device OCSP response and a message signature as mandatory parameters, and may include an extensions as an optional parameter.

After receiving the authentication request message including those parameters from the DRM agent 1, the DRM agent 2 checks the device OCSP response as authentication information among the parameters (S36). By checking the device OCSP response, whether the certificate and the revocation information of the DRM agent 1 are available can be verified.

In addition, the extensions may include a trusted authorities parameter, which denotes en entity (i.e., a trust anchor) trusted by the DRM agent 1. For example, the trust authorities parameter may be represented as a hash value of a 'SubjectPublicKeyInfo' field among contents of the certificate of the trust anchors.

Meanwhile, in response to the authentication request message, the DRM agent 2 checks the device OCSP response to verify validity of the certificate of the DRM agent 1, and then sends an authentication response message (e.g., Auth response) to the DRM agent 1 (S37).

The authentication response message, as shown in the message description of FIG. 7, may include a status, a sender device ID, a receiver device ID, a request nonce, a response nonce, a session ID, a certificate chain, a device OCSP response and a signature as mandatory parameters, and may include an extensions as an optional parameter.

After receiving the authentication response message including those parameters from the DRM agent 2, the DRM agent 1 checks the device OCSP response as authentication information among the parameters (S38). By checking the device OCSP response, the DRM agent 1 can verify whether the certificate and the revocation information of the DRM agent 2 are valid.

Here, if either the DRM agent 1 or the DRM agent 2 does not have the device OCSP response, the DRM agent 1 or the DRM agent 2 must access the RI in order to acquire the latest valid device OCSP response by using a ROAP registration protocol.

As such, after the DRM agent 1 and the DRM agent 2 successfully complete the mutual authentication by exchanging the authentication request message and the authentication response message with each other, each of which includes, as the parameter, the valid device OCSP response of the certificate transferred from the RI, then the RO movement procedure is performed.

A Rights Object (RO), which the DRM agent 1 desires to transfer to the DRM agent 2, may include a Contents Encryption Key (CEK) to access DRM contents and a Rights Encryption Key (REK) to decode the CEK. The REK may be encrypted by using a domain key of a domain to which both the DRM agent 1 and the DRM agent 2 belong, or be encrypted by using a public key of the DRM agent 2 to thusly be transferred.

First, the DRM agent 1 sends a moveRequest message to the DRM agent 2 in order to move the RO (S39).

The moveRequest message, as shown in the message description of FIG. 8, may include a sender device ID, a receiver device ID, a session ID, a nonce, a protected RO and a message signature as mandatory parameters, and may include a state information object as an optional parameter.

The protected RO denotes an actual RO which the DRM agent 1 desires to transfer to the DRM agent 2.

For a stateful RO, the state information object is a format of state information which a DRM agent transfers to another DRM agent. That is, the state information object indicates current state information managed by the DRM agent.

The state information indicates a current state related to rights. The state information denotes information managed by a DRM agent when the rights contain stateful constraints, such as an interval, a count, a time-count, an accumulated and the like, for example.

After receiving the moveRequest message together with the RO, the DRM agent 2 checks the moveRequest message. Then, the DRM agent 2 verifies the message signature, and successfully decodes the REK and the CEK. The DRM agent 2 then verifies validity of the RO transferred from the DRM agent 1 using a MAC key and a MAC value included in an RO parameter of the moveRequest message, and thereafter matches its session ID with a session ID of the DRM agent 1.

When the RO is successfully moved to the DRM agent 2 through those processes, the DRM agent 2 sends a moveResponse message to the DRM agent 1 (S40).

The moveResponse message, as shown in the message description of FIG. 9, may include a status, a sender device ID, a receiver device ID, a session ID, a nonce and a message signature as mandatory parameters.

After receiving a moveResponse message indicating 'Success' from the DRM agent 2, the DRM agent 1 deletes the RO sent to the DRM agent 2 and related state information.

After completely moving the domain RO to the DRM agent 2, the DRM agent 1 sends protected contents to the DRM agent 2.

The first embodiment of the present invention can be applied among a plurality of general DRM agents as well as among a plurality of DRM agents belonging to a user domain.

FIG. 4 is a view illustrating a construction of a system for implementing a method of authentication between DRM agents for moving RO in accordance with a second embodiment of the present invention, and FIG. 5 is a signal flowchart illustrating an authentication procedure for moving RO between DRM agents in accordance with the second embodiment of the present invention.

The second embodiment assumes that a DRM agent (e.g., a DRM agent 3 of FIG. 4) of a plurality of DRM agents having subscription in a user domain moves RO to a DRM agent having no subscription in the user domain.

If a DRM agent to which a domain RO is to be moved has a domain key of a user domain, the DRM agent is considered as being subscribed in the user domain. In order to securely move the RO, the RO may be accepted to be moved between devices both having subscription in the user domain.

However, after a DRM agent 1 having subscription in the user domain discovers a DRM agent 3 having no subscription in the user domain, if the DRM agent 1 desires to move its RO and contents to the DRM agent 3, the following processes are performed.

First, the DRM agent 1 sends a registration request message to the first entity, namely, to the RI, in order to acquire a domain RO and contents (S50), and then receives a registration response message from the RI in response to the registration request (S51), thus to perform a registration procedure.

The registration procedure is the same as that described in the first embodiment. Therefore, it may not be described herein.

After completing the registration and join process, the DRM agent 1 accesses the RI to acquire the domain RO and acquires protected contents from the CI. Here, the domain RO can be acquired only by devices subscribed in the user domain.

Under this state, when the DRM agent 1 discovers the DRM agent 3 having no subscription in the user domain (S52) and desires to move its domain RO and contents to the DRM agent 3, the DRM agent 1 sends an authentication request message (e.g., Auth request) to the DRM agent 3 (S53). Here, the domain RO may include a domain ID.

The DRM agent 3 checks whether it has a device OCSP response for its authentication. If the DRM agent 3 has a valid device OCSP response but has not subscribed yet in a domain matched with the domain ID, the DRM agent 3 subscribes in the domain to acquire a domain key.

If the DRM agent 3 does not have a valid device OCSP response (e.g., if it has not registered in the RI or a current time passes over nextUpdate of the device OCSP response), the DRM agent 3 should request registration from the RI in order to acquire its device OCSP response for the mutual authentication with the DRM agent 1. Accordingly, the DRM agent 3 can acquire a valid device OCSP response.

To this end, the DRM agent 3 first checks RI address information, e.g., RI URL information, which is a parameter included in the authentication request message sent by the DRM agent 1 (S55).

Upon checking the RI URL information, the DRM agent 3 accesses the RI using the RI URL to send a registration request message thereto (S56).

The registration request message may include a session ID, a device nonce, a request time and a signature as mandatory parameters, and may include a certificate chain, a trusted RI authorities, a server info and an extensions as optional parameters.

The extensions parameter may include <DeviceOCSPResponse> for requesting the device OCSP response from the RI.

When receiving the registration request message, the RI includes in a registration response message a device OCSP response parameter including device certificate revocation information transferred from the OCSP server, and then sends the registration response message to the DRM agent 3 (S57).

When the registration is successful, the registration response message may include a status, a session ID, an RI URL and a signature as mandatory parameters, and may include a certificate chain, an OCSP response, a device OCSP response, an extensions and a signature as optional parameters.

The device OCSP response may include certificate revocation information related to a device. The OCSP response is basically used when rights are moved to a device using an A2AP protocol.

The device OCSP response may include 'This update' indicating time information at which the device OCSP response message is issued and 'Next update' indicating expiration time information of the device OCSP response message. Accordingly, these information may optionally be used when verifying validity of the device OCSP response.

After receiving the device OCSP response together with the registration response message, the DRM agent 3 checks the device OCSP response (S59). Then, the DRM agent 3 verifies validity of a device certificate of the DRM agent 1, and sends an authentication response message (e.g., Auth response) to the DRM agent 1 (S60).

The authentication response message may include a status, a sender device ID, a receiver device ID, a request nonce, a response nonce, a session ID, a certificate chain, a device OCSP response and a signature as mandatory parameters, and may include an extensions as an optional parameter.

After receiving the authentication response message including those parameters from the DRM agent 3, the DRM agent 1 checks the device OCSP response among the parameters (S61). By checking the device OCSP response, the DRM agent 1 can verify whether the certificate and the revocation information related to the DRM agent 3 are valid.

In addition, the extensions may include a trusted authorities parameter. The trusted authorities is a parameter used for the DRM agent 1 to request an entity for a reliable authentication from the DRM agent 3, for example, the trusted authorities parameter is a hash value of a 'SubjectPublicKey-Info' field.

As such, after the DRM agent 1 and the DRM agent 2 successfully complete their mutual authentication by exchanging the authentication request message and the authentication response message with each other, each of which includes, as the parameter, the valid device OCSP response of the certificate transferred from the RI, then the RO movement procedure is performed.

A Rights Object (RO), which the DRM agent 1 desires to transfer to the DRM agent 2, may include a Contents Encryption Key (CEK) to access DRM contents and a Rights Encryption Key (REK) to decode the CEK.

First, the DRM agent 1 sends a moveRequest message for moving the RO to the DRM agent 3 (S62).

The moveRequest message may include a sender device ID, a receiver device ID, a session ID, a nonce, a protected RO and a message signature as mandatory parameters, and may include a state information object as an optional parameter.

The protected RO is an actual RO which the DRM agent 1 desires to transfer to the DRM agent 3.

For a stateful RO, the state information object is a format of state information which a DRM agent transfers to another DRM agent. That is, the state information object indicates current state information managed by the DRM agent.

The state information indicates a current state related to rights. The state information denotes information managed by a DRM agent when the rights contain stateful constraints, such as an interval, a count, a time-count, an accumulated and the like, for example.

After receiving the moveRequest message together with the RO, the DRM agent 3 checks the moveRequest message. Then, the DRM agent 3 verifies the message signature, and successfully decodes the REK and the CEK. The DRM agent 3 then verifies validity of the RO transferred from the DRM agent 1 using a MAC key and a MAC value included in an RO parameter of the moveRequest message, and thereafter matches its session ID with the session ID of the DRM agent 1.

When the RO is successfully moved to the DRM agent 3 through those processes, the DRM agent 3 sends a moveResponse message to the DRM agent 1 (S63).

The moveResponse message, as shown in the message description of FIG. 9, may include a status, a sender device ID, a receiver device ID, a session ID, a nonce and a message signature as mandatory parameters.

After receiving a moveResponse message indicating 'Success' from the DRM agent 3, the DRM agent 1 deletes the RO sent to the DRM agent 3 and related state information.

After completely moving the domain RO to the DRM agent 3, the DRM agent 1 sends protected contents to the DRM agent 3.

As described above, the present invention has been explained with reference to the embodiments which are merely exemplary. It will be apparent to those skilled in the art that various variations and equivalent embodiments can be made in the present invention without departing from the spirit or scope of the invention.

Effect of the Invention

In accordance with the present invention, when moving an RO in a user domain or among a plurality of general DRM agents, a mutual authentication can simply be executed among the DRM agents using a device OCSP response as specific authentication information transferred from an RI, and thereafter the RO and contents can be moved.

The invention claimed is:

1. A method of authentication between mobile devices, the method comprising:
   transmitting, by a first mobile device, an authentication request message including a first authentication information to a second mobile device;
   receiving, by the first mobile device, an authentication response message including a second authentication information from the second mobile device after verifying whether the first authentication information is valid by the second mobile device;
   verifying, by the first mobile device, whether the second authentication information is valid,
   wherein the first mobile device receives from a management server, rights information on permissions or constraints for using content, and
   transmitting, by the first mobile device, the rights information to the second mobile device,
   wherein the first authentication information comprises a first certification message having certificate revocation information related to the first mobile device, the first certification message being obtained from the management server when the first mobile device registers to the management server before transmitting the rights information to the second mobile device and provided from a certification server, and
   wherein the second authentication information comprises a second certification message having certificate revocation information related to the second mobile device, the second certification message being obtained from the management server when the second mobile device registers to the management server before receiving the rights information from the first mobile device and provided from the certification server,
   wherein each of the first certification message and the second certification message includes first time information indicating when the certification message is issued and second time information indicating when the certification message expires, and
   wherein the verifying performed by the first mobile device is based on the first time information and the second time information included in the second certification message, and the verifying performed by the second mobile device is based on the first time information and the second time information included in the first certification message.

2. A method of authentication between mobile devices, the method for moving a rights information on permissions or constraints for using content comprising:
  receiving, by a first mobile device, a first authentication information emanating from a certification server, in response to a first registration request;
  receiving, by a second mobile device, a second authentication information emanating from the certification server, via a management server in response to a second registration request;
  transmitting, by the first mobile device, the first authentication information included in an authentication request message to the second mobile device;
  receiving, by the first mobile device, the second authentication information included in an authentication response message from the second mobile device, after the second mobile device verifies whether the first authentication information is valid; and
  transferring, by the first mobile device, a rights information on permissions or constraints for using content issued by the management server to the second mobile device, after verifying whether the second authentication information received by the first mobile device is valid,
  wherein the first authentication information comprises a first certification message having certificate revocation information related to the first mobile device, the first certification message being obtained from the management server when the first mobile device registers to the management server before transferring the rights information to the second mobile device,
  wherein the second authentication information comprises a second certification message having certificate revocation information related to the second mobile device, the second certification message being obtained from the management server when the second mobile device registers to the management server before receiving the rights information from the first mobile device,
  wherein each of the first certification message and the second certification message includes first time information indicating when the certification message is issued and second time information indicating when the certification message expires, and
  wherein the verifying performed by the first mobile device is based on the first time information and the second time information included in the second certification message, and the verifying performed by the second mobile device is based on the first time information and the second time information included in the first certification message.

3. The method of claim 2, wherein the first registration request message includes a parameter for requesting a certification message including certificate revocation information related to the first mobile device for authenticating the first mobile device when the first mobile device transmits the first registration request message.

4. The method of claim 3, wherein each of the first and second certification message comprises 'This update' information indicating time information at which the certification message is issued and 'Next update' information indicating expiration time information of the certification message, wherein the 'This update' information and the 'Next update' information are optionally used when verifying a validity of the certification message.

5. The method of claim 2, wherein the first certification message is a certification message of the first mobile device transferred from the management server via a 4-pass registration protocol, and the first mobile device accesses the management server to acquire a latest valid certification message using a specific protocol for acquiring rights information if the first mobile device does not have the certification message.

6. The method of claim 2, wherein the first registration request message further includes a trusted authorities parameter, which is a parameter by which a mobile device requests an entity for a reliable authentication from a mobile device to which a rights information on permissions or constraints for using content is to be moved, and the trusted authorities parameter is a hash value of a 'SubjectPublicKeyInfo' field.

7. The method of claim 2, wherein the step of transferring the rights information on permissions or constraints for using content further comprises:
  transmitting a move request message including a first information from the first mobile device to the second mobile device; and
  receiving by the first mobile device a move response message including a second information from the second mobile device.

8. The method of claim 7, wherein the first information of the move request message comprises one or more parameters of a sender device ID, receiver device ID, session ID, nonce, protected rights information on permissions or constraints for using content, message signature and state information object.

9. The method of claim 8, wherein the state information object is a current state information managed by a mobile device.

10. The method of claim 9, wherein the state information indicates a current state related to rights information managed by a mobile device.

11. The method of claim 7, wherein the second information comprises one or more parameters of a status, sender device ID, receiver device ID, session ID, nonce and message signature.

12. A method of authentication between mobile devices for moving a rights information on permissions or constraints for using content, comprising:
  transmitting, by the first mobile device, an authentication request message including a first authentication information to a second mobile device;
  verifying, by the second mobile device, the first authentication information to authenticate the first mobile device;
  receiving, by the first mobile devices, an authentication response message including a second authentication information from the second mobile device; and
  verifying, by the first mobile devices, the received second authentication information to authenticate the second mobile device,
  wherein the step of verifying the first authentication information or the second authentication information includes a determination as to whether certification revocation information related to the first or second mobile devices is valid, by checking a certification message transferred from a management server,
  wherein the first authentication information comprises a first certification message having certificate revocation information related to the first mobile device, the first certification message being obtained from the management server when the first mobile device registers to the management server before moving the rights information to the second mobile device, and wherein the second authentication information comprises a second certification message having certificate revocation information related to the second mobile device, the second certification message being obtained from the management server when the second mobile device registers to the management server before moving the rights information to the first mobile device, wherein each of the first certification message and the second certification message includes first time information indicating when the certification message is issued and second time information indicating when the certification message expires, and wherein the verifying performed by the first mobile device is based on the first time information and the second time information included in the second certification message, and the verifying performed by the second mobile device is based on the first time information and the second time information included in the first certification message.

13. A system facilitating authentication between mobile devices to move a rights information on permissions or constraints for using content, the system comprising:

a first entity adapted to transfer authentication information including certificate revocation information to a plurality of mobile devices;

a first mobile device adapted to receive a first authentication information and a rights information on permissions or constraints for using content from the first entity, and to transmit the first authentication information as part of an authentication request message to the second mobile device; and a second mobile device adapted to check the first authentication information of the authentication request message received from the first mobile device, to authenticate the first mobile device, and transmit to the first mobile device a second authentication information, together with an authentication response message to allow the first mobile device to authenticate the second mobile device by checking the authentication response message and the second authentication information, wherein the first entity is configured as a management server which receives the first authentication information and the second authentication information from a certification server that is configured to transmit authentication information to a plurality of mobile devices, together with a registration response message, after the management server receives a registration request from a mobile device, wherein the first authentication information comprises a first certification message having certificate revocation information related to the first mobile device, the first certification message being obtained by the first mobile device from the management server when the first mobile device registers to the management server before moving the rights information to the second mobile device, wherein the second authentication information comprises a second certification message having certificate revocation information related to the second mobile device, the second certification message being obtained by the second mobile device from the management server when the second mobile device registers to the management server before moving the rights information to the first mobile device, wherein each of the first certification message and the second certification message includes first time information indicating when the certification message is issued and second time information indicating when the certification message expires, and wherein the authentication performed by the first mobile device is based on the first time information and the second time information included in the second certification message, and the authentication performed by the second mobile device is based on the first time information and the second time information included in the first certification message.

* * * * *